United States Patent
Rieger

(10) Patent No.: US 7,262,403 B2
(45) Date of Patent: Aug. 28, 2007

(54) SAFETY LIGHT GRID

(75) Inventor: Daniel Rieger, Freiburg (DE)

(73) Assignee: Sick AG, Waldkirch (DE)

( * ) Notice: Subject to any disclaimer, the term of this patent is extended or adjusted under 35 U.S.C. 154(b) by 70 days.

(21) Appl. No.: 10/985,294

(22) Filed: Nov. 10, 2004

(65) Prior Publication Data

US 2005/0109920 A1      May 26, 2005

(30) Foreign Application Priority Data

Nov. 20, 2003   (DE)   ............. 203 17 976 U

(51) Int. Cl.
 G06M 7/00      (2006.01)
 G08B 13/18     (2006.01)
(52) U.S. Cl. ..................... 250/221; 340/556
(58) Field of Classification Search ........... 250/221, 250/206; 340/556
 See application file for complete search history.

(56) References Cited

U.S. PATENT DOCUMENTS

| | | | |
|---|---|---|---|
| 5,003,169 A * | 3/1991 | Sakaguchi et al. ......... 250/221 |
| 2003/0141975 A1 * | 7/2003 | Hama et al. ............. 340/556 |
| 2003/0218122 A1 * | 11/2003 | Haberer et al. ............ 250/221 |
| 2004/0064205 A1 * | 4/2004 | Kloper et al. ............. 700/86 |
| 2004/0124341 A1 * | 7/2004 | Parstorfer et al. .......... 250/221 |

FOREIGN PATENT DOCUMENTS

| | | |
|---|---|---|
| DE | 23 43 096 A1 | 8/1973 |
| DE | 3919167 C1 | 9/1990 |
| DE | 10046863 C1 | 1/2002 |
| DE | 10216123 A1 | 11/2003 |
| EP | 0 605 252 A1 | 7/1994 |
| EP | 1 116 963 A2 | 7/2001 |
| EP | 1 331 433 A2 | 7/2003 |
| FR | 2 757 980 A1 | 7/1998 |
| JP | 56 114780 | 9/1981 |
| WO | WO99/67759 A2 | 12/1999 |

* cited by examiner

*Primary Examiner*—Georgia Epps
*Assistant Examiner*—Kevin Wyatt
(74) *Attorney, Agent, or Firm*—Townsend and Townsend and Crew, LLP; J. Georg Seka; Patrick J. Zhang

(57) ABSTRACT

A safety or security light grid for monitoring a protected field having a light transmitting strip, which has a row of light transmitters arranged alongside each other, and a light receiving strip, which has light receivers arranged alongside each other associated with respective light transmitters, so that a plurality of parallel light barriers form the protected field. There is at least one control and evaluation unit, which controls and evaluates the individual light barriers for generating a warning signal when one or more light barriers are interrupted by an object. The light grid has two input elements and at least one display element for configuring the light grid.

6 Claims, 2 Drawing Sheets

SAFETY LIGHT GRID

BACKGROUND OF THE INVENTION

The invention concerns a safety or security light grid for monitoring a protected field or area.

Safety light grids protect persons and property against damage from dangerous machinery, such as bending presses, stamping machines, cutting tools, welding robots and the like. The safety light grid detects unauthorized entry into dangerous zones by monitoring the protected field covered by the light grid against penetration by an object. If the protected field is penetrated, the safety light grid generates an appropriate signal, which can be used, for example, to deactivate the machine.

Depending on the application, the light grid must be configured prior to its first use as well as after being replaced. By way of example, during a configuring process, the following might be set up:

whether the protective monitoring should be active or inactive, whether a restart interlock should be active or inactive, the operative range (long- or short-range) that should be set up, what kind of signal should be fed to a diagnostic output, which of several predetermined muting times should be selected.

Light grids are known in which the configuration data are set up by means of wire bridges at the light grid itself or at a corresponding controller. This is time-consuming and labor-intensive and requires that certain processes be established in the device so that the set function does not change unintentionally in event of a simple error, such as a broken wire. This configuration, therefore, entails security risks and is not very comfortable.

So-called DIP switches are known for configuring purposes, but they have the drawback that they can only be serviced by a technician and they are situated on the inside of the device. It is therefore always necessary to open the device to make or change settings.

Safety light grids are also known which can be configured via a graphics user interface. For this, a computer or an SPS and a corresponding interface at the light grid for connection to the computer or the SPS are needed. Although the entry process is comfortable, a drawback is that this is costly because it requires an accessory device, such as a PC and a communication interface.

SUMMARY OF THE INVENTION

In view of the foregoing, it is an object of the invention to create a light grid of the kind mentioned in the beginning, which is easy and economical to configure.

The light grid of the present invention for monitoring a protected field has a light transmitting strip and a light receiving strip which define a plurality of light barriers that are parallel to each other and define the protected field. A control and evaluation unit controls and evaluates the individual light barriers, and a warning signal is generated when one or more light barriers are interrupted by an object. Configuring means are provided for configuring the light grid prior to its use. According to the invention, the configuring means are formed by two input elements and at least one display element.

An important benefit of the invention is that the input of the configuration data is easy, fast and comfortable via only two input elements and requires no additional devices, such as a PC, a device communication interface, or the like. Simple functions can be switched on and off and provide selection alternatives. There are no complex and elaborate settings. The light grid of the invention is therefore very economical.

In order to meet high safety and/or security requirements, the control and evaluation unit is designed so that the configuration data can be inputted in a failsafe manner via input elements. This means that a static signal at one of the input elements, e.g. by depressing a push button or as a result of wrongly activating the input element, can be identified by the control and evaluation unit and does not lead to a change in configuration.

In a structurally simple embodiment, the two input elements are formed as push buttons because of the ease with which they can be operated.

Seven-segment indicators are frequently used in light grids for displaying operating states. It is advantageous to use such indicators for the display of configuration parameters.

In order to achieve a compact and economical layout, the configuring means are integrated in the light receiving strip. In this manner, the number of auxiliary devices can be reduced, which saves costs.

For a clear and intuitive entering of configuration data, one of the input elements is designated for choosing a function and the other for selecting of a chosen function.

In order to enable a failsafe activating of the configuring mode, both input elements can be activated at the same time.

DESCRIPTION OF THE PREFERRED EMBODIMENTS

Figure 1:
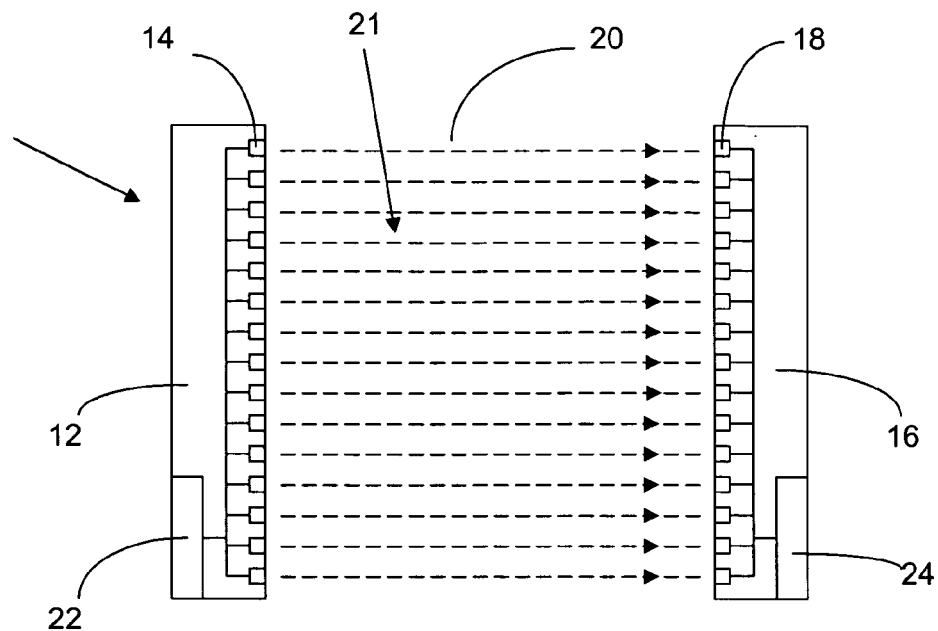
FIG. 1 is a schematic view of a light grid constructed according to the invention.
Figure 2:
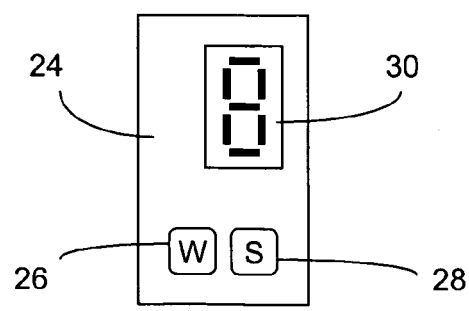
FIG. 2 is a schematic representation of input and display elements for configuring a light receiving strip of the light grid of FIG. 1.

A light grid 10 made in accordance with the present invention has a light transmitting strip 12 with a row of light transmitters 14 arranged alongside each other, and a light receiving strip 16 which has light receivers 18 arranged alongside each other that correspond to and are associated with light transmitters 14. Each oppositely situated light transmitter 14 and light receiver 18 form in familiar fashion a plurality of mutually parallel light barriers 20. Their light beams are shown in FIG. 1 by broken lines. The light grid 10 with its light barriers 20 thus defines a monitoring zone with a protected field 21 between transmitting strip 12 and receiving strip 16. The light grid 10, furthermore, has at least one control and evaluation unit. In the sample embodiment shown, at least one control and evaluation unit 22 and 24 respectively is provided in both the transmitting strip 12 and the receiving strip 16. The control and evaluation unit 22 controls the individual light transmitters 14 of the transmitting strip 12, and the control and evaluation unit 24 of the receiving strip controls the light receivers 18 and evaluates their output signal so that, if an object interrupts one or more light barriers 20, the control and evaluation unit generates a warning signal. This signal can be used to deactivate, for example, a dangerous machine.

The basic functioning of such a light grid is described, for example, in German patent document DE 38 03 033 A1. The individual light barriers 20 of the light grid 10 are cyclically activated in order. In this process, the light transmitters 14 and light receivers 18 are optically synchronized via the first and/or the last light transmitter, for example, so that the light receiver which happens to be opposite the particular sending light transmitter is always activated. Accordingly, an electrical connection between the transmitting strip 12 and the receiving strip 16 is not necessary.

The light grid of the present invention is designed such that different configurations can be set up depending on the application at hand. The corresponding configuration has to be memorized in the light grid prior to its first use as well as after its replacement. The functional parameters can be entered in a configure mode prior to commencing operation, depending on which functions are to be set up on the light grid. These functions can be, for example:

an activating or deactivating of protection monitoring, an activating or deactivating of a restart interlock, a long- or short-range reach, which signal should be present at a diagnostic output, which of a predetermined array of muting times should be selected.

For entering configuration parameters, configuring means are provided at the light grid 10, preferably at the control and evaluation unit 24 of the receiving strip 16. The unit has two input elements, which, in a preferred embodiment, are configured as push buttons 26 and 28, and a display unit, which is configured as a seven-segment display 30.

Figure 3:
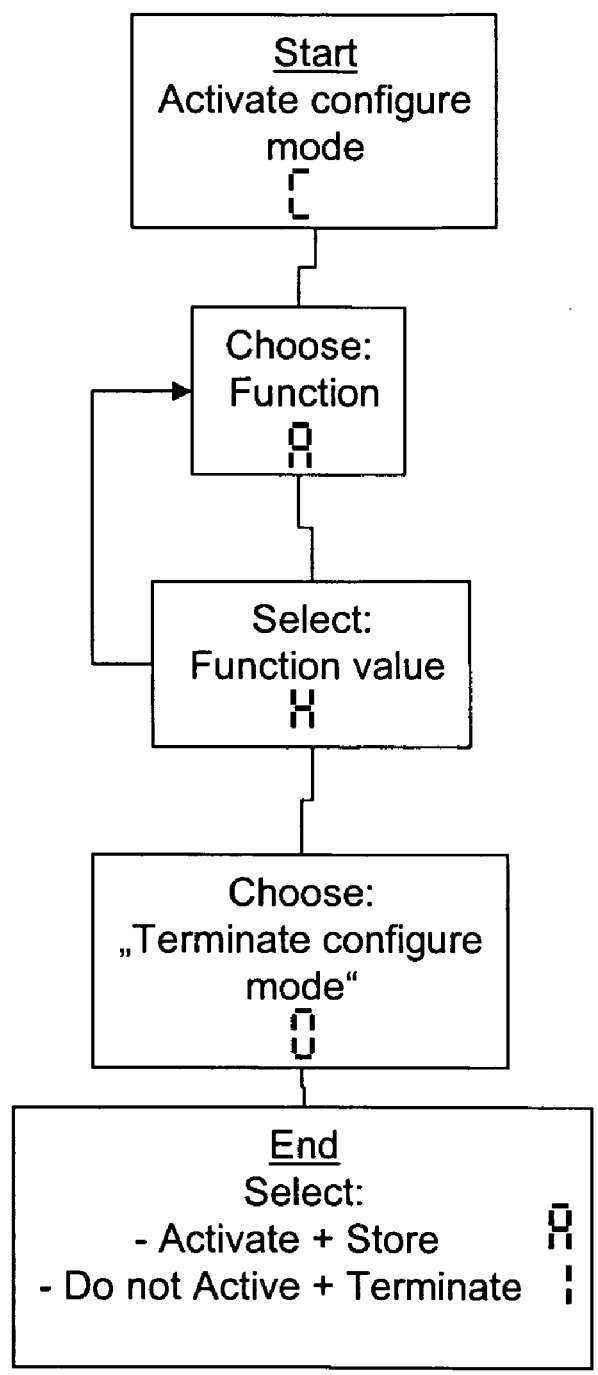
FIG. 3 is a flow diagram which illustrates the configuring process.

To illustrate the individual features of the invention and its mode of functioning, the configuring process is described for a given function. For example, the range of the light grid is to be configured. This process is illustrated in FIG. 3.

At first, the light grid is placed in its configure mode; i.e. its configure mode is activated. For this, both push buttons 26 and 28 are pressed down at the same time for a predetermined period of time. Other activation ways can of course be employed. For example, both push buttons could be pressed down at the same time twice in succession and then released.

After activating the configure mode, a symbol appears in the seven-segment display 30, which symbolizes this condition; in the illustrated embodiment the symbol is "C".

Then, by depressing key 26, the desired function is set up. It should be noted that all functions which can be set up in the configure mode and their functional values have a particular "value" in the seven-segment display. In the illustrated embodiment, the resulting symbol for the range is "A".

Key 26 is now depressed as often as it takes for the symbol for the range value setting to appear. Then, using the second key 26, the range, i.e. the desired value of the function, is selected. For example, if two different range values can be set ("high" and "low"), and the higher range is supposed to be set, key 28 is depressed until the associated symbol appears, e.g. "H".

The range is now configured. Key 26 can be depressed to select another function for configuring or the configure mode can be terminated. Termination occurs when first key 26 is used to choose the function "terminate configure", which is displayed for example by the symbol "O".

Then, with the second key 28, a selection is made whether to save the entered configuration and exit the configure mode or not to save the entered configuration and exit the configure mode. For this, second key 28 is used to select whether or not to save, which may be indicated, for example, by the symbols "A", and "I".

Thereafter, by activating key 28 a second time, the selected function is executed and the configure mode is exited.

A special feature is the layout of the control and evaluation unit, so that a failsafe entry is assured. In this way, one makes sure that, for example, a prolonged pressing down of a key or a wrong key pressing sequence does not lead to setting an unwanted configuration.

What is claimed is:

1. A safety light grid for monitoring a protected field comprising a light transmitting strip with light transmitters arranged alongside each other, a light receiving strip with light receivers arranged alongside each other and cooperating with respective light transmitters for generating a plurality of parallel light barriers forming the protected field, a control and evaluation unit which controls and evaluates the individual light barriers and produces a warning signal when at least one light barrier is interrupted by an object, and first and second input elements and at least one display element for configuring the light grid, wherein the first and second input elements must be simultaneously activated to configure the light grid in a failsafe manner to prevent an erroneous configuration of the light grid.

2. A light grid for monitoring a protected field comprising a light transmitting strip with light transmitters arranged alongside each other, a light receiving strip with light receivers arranged alongside each other and cooperating with respective light transmitters for generating a plurality of parallel light barriers forming the protected field, a control and evaluation unit which controls and evaluates the individual light barriers and produces a warning signal when at least one light barrier is interrupted by an object, and first and second input elements and at least one display element for configuring the light grid, wherein the first and second input elements must be simultaneously activated to configure the light grid in a failsafe manner to prevent an erroneous configuration of the light grid, and wherein the input elements are push buttons integrated in the light receiving strip.

3. A light grid according to claim 2 wherein the display element is a seven-segment display.

4. A light grid according to claim 2 wherein one of the input elements is configured for choosing a function and the other of the input elements is configured for selecting a function value.

5. A light grid according to claim 4 wherein the function is one of a protective monitoring activation function, a restart lock activation function, an operating range selection function, a diagnostic output signal selection function, and a muting time selection function.

6. A safety light grid for monitoring a protected field comprising a light transmitting strip with light transmitters arranged alongside each other, a light receiving strip with light receivers arranged alongside each other and cooperating with respective light transmitters for generating a plurality of parallel light barriers forming the protected field, a control and evaluation unit which controls and evaluates the individual light barriers and produces a warning signal when at least one light barrier is interrupted by an object, and a configuration device including first and second input elements and at least one display element for inputting configuration data and configuring the light grid, wherein the input elements must be simultaneously activated for activating a configure mode, wherein the input elements are push buttons integrated in the light receiving strip, wherein the configuration parameters that can be inputted comprise at least one of activating or deactivating a protective monitoring function, activating or deactivating a restart lock function, a short-length or a long-length operating range function, a diagnostic output signal selecting function, and a muting time function, and wherein the control and evaluation unit is capable of preventing configuration changes by detecting the activation of one input element or of a wrong series of input element activations to assure a failsafe inputting of the at least one configuration parameter.

* * * * *